(12) United States Patent
Muckenhuber et al.

(10) Patent No.: US 8,499,294 B2
(45) Date of Patent: Jul. 30, 2013

(54) PERSISTING THE CHANGES FOR MANAGED COMPONENTS IN AN APPLICATION SERVER

(75) Inventors: Emanuel Muckenhuber, Neuchatel (CH); Scott M. Stark, North Bend, WA (US); Adrian Brock, Neuchatel (CH)

(73) Assignee: Red Hat, Inc., Raleigh, NC (US)

( * ) Notice: Subject to any disclaimer, the term of this patent is extended or adjusted under 35 U.S.C. 154(b) by 941 days.

(21) Appl. No.: 12/570,882

(22) Filed: Sep. 30, 2009

(65) Prior Publication Data

US 2011/0078673 A1 Mar. 31, 2011

(51) Int. Cl.
*G06F 9/44* (2006.01)

(52) U.S. Cl.
USPC ........... 717/168; 717/120; 717/110; 717/113; 717/121; 709/223; 709/221; 709/224

(58) Field of Classification Search
USPC ....................................................... 709/221
See application file for complete search history.

(56) References Cited

U.S. PATENT DOCUMENTS

| | | | | |
|---|---|---|---|---|
| 6,912,710 B2* | 6/2005 | Broussard et al. | ............ | 717/170 |
| 7,069,553 B2* | 6/2006 | Narayanaswamy et al. | .. | 717/173 |
| 7,194,730 B2* | 3/2007 | Pramberger | ................... | 717/120 |
| 7,343,379 B2* | 3/2008 | Marvin et al. | ......................... | 1/1 |
| 2003/0101245 A1* | 5/2003 | Srinivasan et al. | ............ | 709/221 |
| 2004/0158585 A1* | 8/2004 | Kovacs et al. | ............... | 707/104.1 |
| 2005/0262499 A1* | 11/2005 | Read | ............................. | 717/172 |
| 2005/0278274 A1* | 12/2005 | Kovachka-Dimitrova et al. | ................................ | 707/1 |
| 2006/0184662 A1* | 8/2006 | Rivierre et al. | ............... | 709/224 |
| 2006/0225039 A1* | 10/2006 | Smith | ............................ | 717/121 |
| 2010/0049959 A1* | 2/2010 | Arcese et al. | ..................... | 713/1 |
| 2010/0146481 A1* | 6/2010 | Binder et al. | ................. | 717/110 |

* cited by examiner

*Primary Examiner* — Lewis A Bullock, Jr.
*Assistant Examiner* — Natisha Cox
(74) *Attorney, Agent, or Firm* — Lowenstein Sandler LLP

(57) ABSTRACT

A method and a system maintain a change to a component in an application server after the application server is re-started. The application server can be a Java-based application server that runs on a computer coupled to a management console. Through the management console, the application server receives an updated value of a component during runtime of the component. A profile service in the application server associates the component to a deployment descriptor that refers to an original value of the components. A representation of the component is then created and stored in a persistence data format in non-volatile data storage. The representation includes the updated value and indicates an association of the component with the deployment descriptor. When the application server is re-started, the representation is applied to the deployment descriptor to override the original value with the updated value.

14 Claims, 6 Drawing Sheets

PERSISTING THE CHANGES FOR MANAGED COMPONENTS IN AN APPLICATION SERVER

TECHNICAL FIELD

Embodiments of the present invention relate to computer programming, and more specifically, to a Java-based application server.

BACKGROUND

An application server is a software engine that delivers applications to client computers or devices. An application server typically bundles middleware to enable applications to intercommunicate with dependent applications, like web servers, database management systems, and chart programs. Middleware is computer software that connects and integrates software components ("components") or applications. Middleware is used most often to support complex, distributed applications.

Managing the components in an application server can be a complex task. Conventional techniques do not provide an efficient mechanism for managing the properties of a component. A system administrator may wish to modify a component at runtime to satisfy a specific service requirement. However, performing the modification can be cumbersome and the modification may not survive a restart of the application server.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Figure 1:
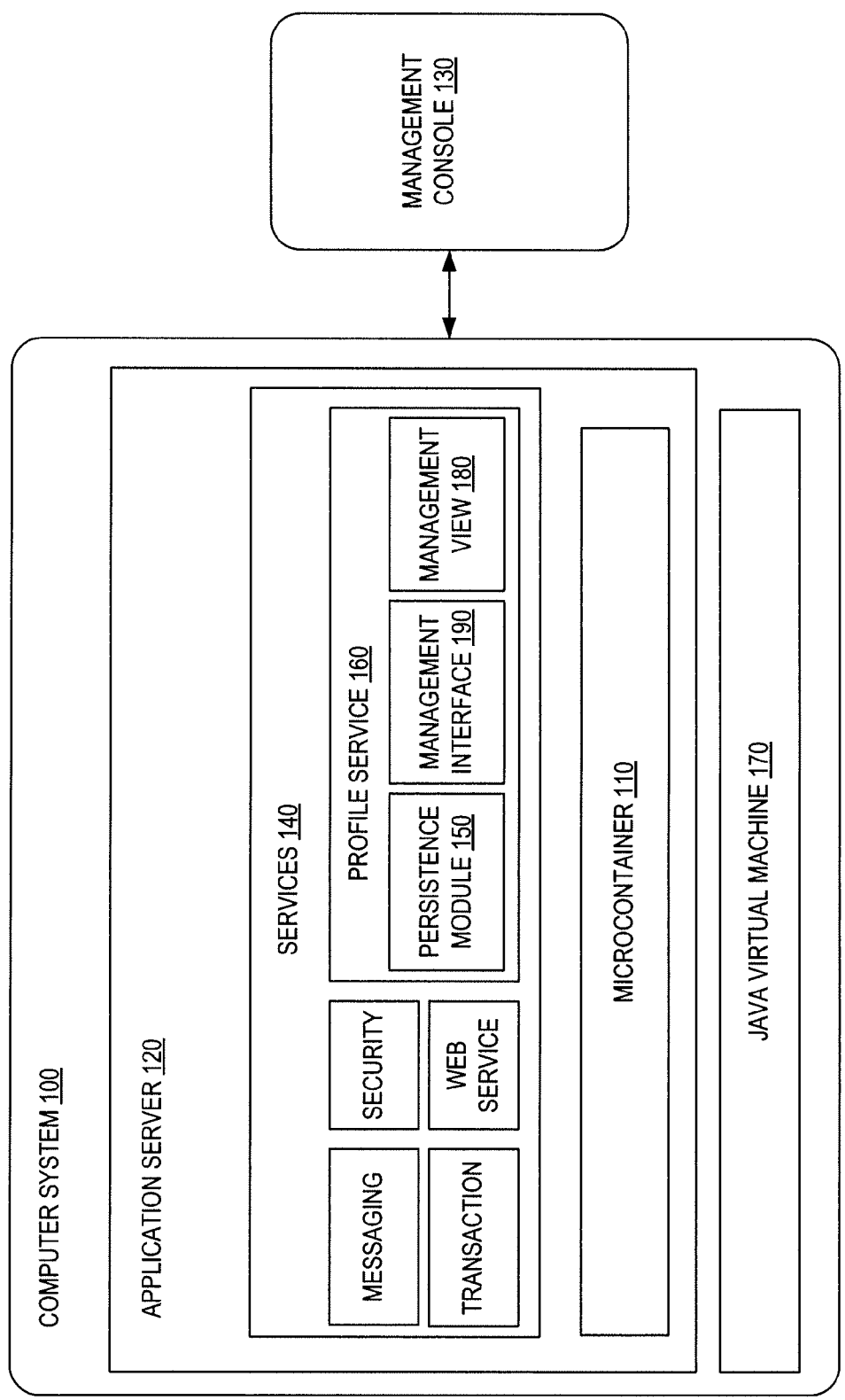
FIG. 1 is a block diagram illustrating one embodiment of a computer system hosting an application server that includes a profile service.

Described herein is a method and system for maintaining a change to a component in an application server after the application server is re-started. In one embodiment, the application server is a Java-based application server that runs on a computer coupled to a management console. Through the management console, the application server receives an updated value of a component during runtime of the component. A profile service in the application server associates the component to a deployment descriptor that defines deployment specific values. A representation of the component is then created and stored in a persistence data format in non-volatile data storage. The representation includes the updated value and indicates an association of the component with the deployment descriptor. When the application server is re-started, the representation is applied to the deployment descriptor to override the original value with the updated value.

An advantage of the profile service described herein is that an update made during the runtime of a component can persist a restart of the application server. The term "component" refers to a reusable software program that can be developed and assembled easily to create sophisticated applications. An application server generally runs a component that has been compiled into an archive, e.g., .jar files, .ear files, etc. The component can have a number of properties, with each property having a value that comes with the archive (referred to as "an original value). Some of the properties are called "managed properties," which can be managed by a system administrator through a management console. The components having the managed properties are called "managed components." The value of a managed property can be updated by the system administrator at runtime. The update does not modify the archive. Instead, the update is stored persistently in non-volatile data storage, and can automatically be applied to the component at runtime, as well as when the application server is re-started. Direct updating of the archive is undesirable, because the archive would first need to be uncompressed, updated with the changes, and then re-packed. The persistence operations to be described herein not only manage the persistence of the changes, but also automatically map the data format of the update to a persistence data format that is compatible with the type of the container in the application server and the requirement of the service provider.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "associating", "storing", "applying", "dispatching", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

FIG. 1 is a block diagram that illustrates an embodiment of a computer system 100 that hosts an application server 120. The computer system 100 may include one or more server machines. The application server 120 can be accessed by one or more remote clients over a network (not shown), such as a private network (e.g., a local area network (LAN), wide area network (WAN), intranet, etc.) or a public network (e.g., the Internet). The application server 120 runs user applications to provide enterprise services 140, such as Web service, messaging, security, transaction, etc. The user applications can be implemented with a wide range of component models, including, but not limited to, POJO (Plain Old Java Objects), Spring, Guice, OSGi, JavaBeans, Java Management Extensions (JMX) Managed Beans (MBeans), Enterprise Java Bean version 3 (EJB3), etc. The user applications can include .jar files, .ear files, .war files, .xml files, Spring Beans, OSGi bundles, etc.

The term "component model" refers to a collection of components and the interactions among these components. Components are reusable software programs that can be developed and assembled easily to create sophisticated applications. For example, JMX MBeans is a component model and MBeans are the components. With JMX MBeans, interactions among the MBeans include executing MBean operations, referencing attributes, setting attributes and declaring explicit dependencies between named MBeans. Interactions among the components of other component models can be similarly described.

In one embodiment, the application server 120 includes a container, such as a microcontainer 110, to support the services 140. The term "container" herein refers to a software construct (e.g., class) that holds or organizes software objects (e.g., Java objects). A container also includes methods for adding and removing objects, as well as methods for iterating the addition and removal of the objects. The microcontainer 110 processes the components from various component models through a sequence of deployment stages to generate fully installed components that run on a Java Virtual Machine (JVM) 170. The components can be plug-in components. At runtime, the microcontainer 110 integrates the components and applies dependencies and aspects across the components. Thus, the microcontainer 110 serves as an integration spine for the various components of various component models. Although the microcontainer 110 is shown, it is understood that the container in the application server 120 can include a JMX container, an EJB3 container, or a container for a different component model.

In one embodiment, the application server 120 also includes a profile service 160, which is a module that provides a runtime infrastructure for dynamically configuring deployed components (also referred collectively as a deployment). The profile service 160 can be software, hardware, or a combination of both. The profile service 160 is responsible of finding or discovering deployments in a repository or a folder of the file system. The profile service 160 aggregates metadata generated by deployers when the components are deployed. The metadata describes the structure and dependencies of the deployments, as well as the configuration settings of the deployments. Based on the information, the profile service 160 manages lifecycles of the deployments, e.g., when to start and end a deployment, and determines the objects to instantiate when the deployments start. The profile service 160 also manages updates to the deployments. For example, if a property of a deployment is changed, the profile service 160 will propagate the change to the components of the deployment that uses the property.

There are many ways a change can be made to a deployment. For example, an update can be made to a managed property of a deployment through a management interface 190. An update can also be made by adding plug-ins to a deployment at runtime. In one embodiment, the management interface 190 includes a user application programming interface (API) for an administrator to access managed properties of a deployment. The user API can provide a view (e.g., a management view 180) of the managed properties and their values via a management console 130. In one embodiment, the management console includes a display coupled to the computer system 100, either directly or via a network (e.g., a local network or a wide-area communication network). The functionalities of the management interface 190 and the management view 180 provide the system administrator with the ability, for example, to configure the value a managed property (also referred to as "managed value"), remove a bug and add missing interfaces.

For example, a managed property of a component can be "min-pool-size," which is a configurable property specific to a type of a component. The "min-pool-size" defines the initial size of a connection pool to a data source, such as a database.

A system administrator can change the value of the "min-pool-size" via the management view 180.

When a system administrator updates a component, e.g., by updating a component, adding a component, or removing a component, the change overrides the existing values of the component. The change is also recorded by a persistence module 150 of the profile service 160, such that when the application server 120 is re-started, the change persists the re-start and will be automatically applied to the component.

Figure 2:
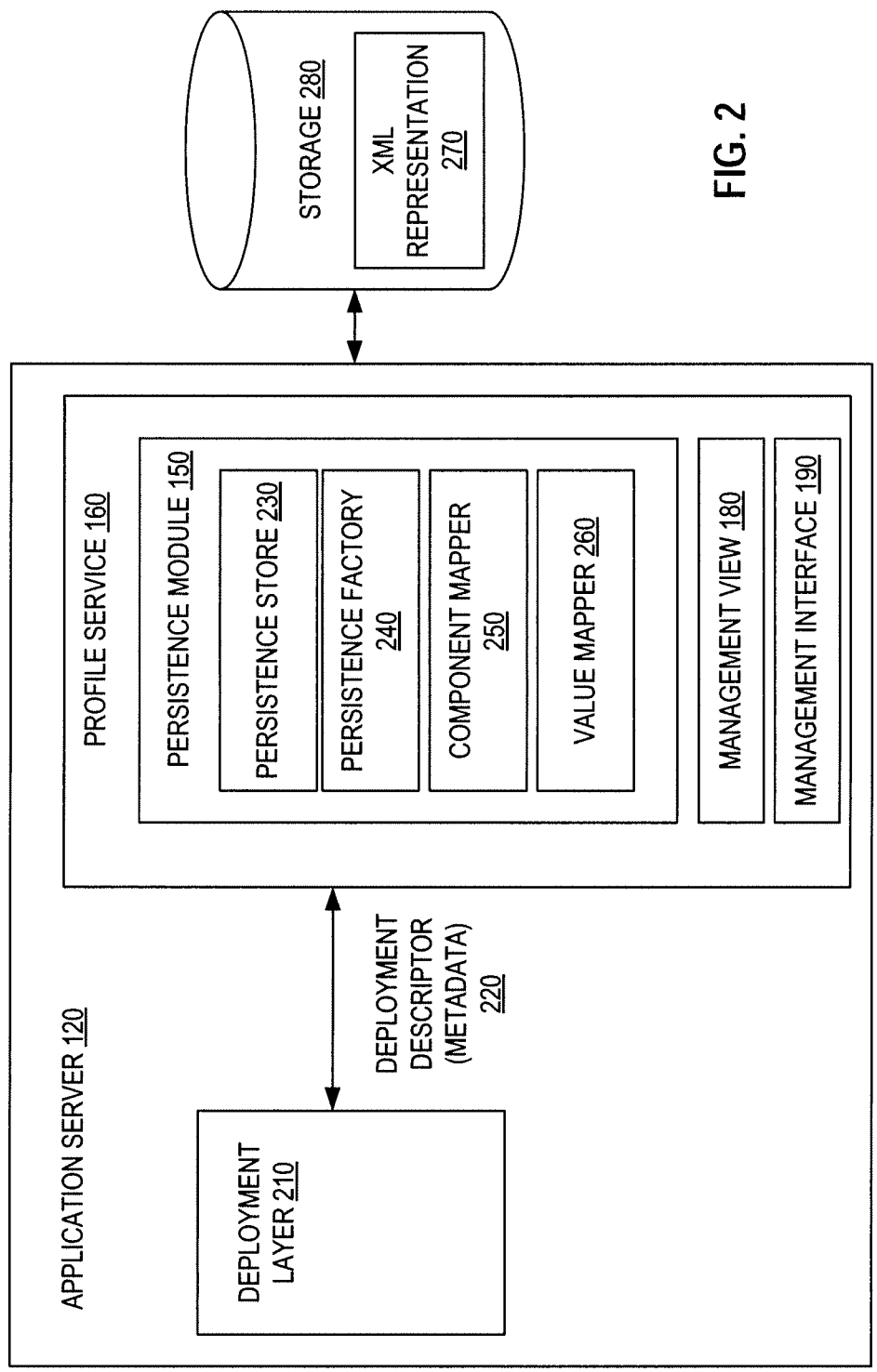
FIG. 2 is a block diagram illustrating one embodiment of the profile service of FIG. 1.

FIG. 2 illustrates an embodiment of the application server 120 in further detail. In this embodiment, the application server 120 includes a deployment layer 210 to deploy and install a component into the microcontainer 110. During the deployment process, the deployment layer 210 generates one or more deployment descriptors 220 (also referred to as "metadata") associated with a component. The metadata contains information about the component, such as dependencies on other components. For example, the metadata may indicate that certain POJOs should be run together or wired in a particular way, or one POJO should be given to another POJO at a certain time. The metadata also contains information about ("refers to") the original managed values of the component. The metadata is passed onto the profile service 160.

In one embodiment, the profile service 160 includes the management interface 190 and the persistence module 150. The profile service 160 further includes a persistence store 230, a persistence factory 240, a component mapper 250 and a value mapper 260. The persistence store 230 manages the changes to a component made by a system administrator during the runtime. The persistence store 230 calls the persistence factory 240 to perform persistence changes to the component, creates a representation of the change to the component, and stores the representation into storage 280 (e.g., disks or other non-volatile storage). In one embodiment, the representation is an Extensible Markup Language (XML) representation 270.

In one embodiment, the end user API (e.g., the management view 180) is wrapped in the persistence factory 240. The persistence factory 240 exposes persistence operations, including addComponent, updateComponent, removeComponent. To perform these operations, a number of parameters need to be identified, which include: the persistence root associated with the component, which points to the XML representation 270 of the component, a deployment descriptor associated with the component, and the component that is being modified. Further, the persistence factory 240 also exposes a restore operation restorePersistenceRoot to restore the updated value from the original value of the component after a restart of the application server 120.

The component mapper 250 can be used to identify a changed component for a give component model. The component mapper 250 can also be used to identify a component after a restart of the application server 120 or after a "name" (unique identifier) change to the component. The container of each component model can have a different unique name for its components. For example, a JMX container uses an ObjectName, a microcontainer uses a normal String by default, and an EJB3 container uses the deployment name plus the deployment descriptor name. The component mapper 250 is usually bound to a specific component type (component model), and then identifies the component based on its specific identifier; e.g., the bean name, the ObjectName or a set of properties which build the unique identifier. After a component is identified, the persistence module 150 can properly map the component to its deployment descriptor and create the XML representation 270 including the mapping or an association describing the mapping.

The value mapper 260 may be plugins that map the value entered by a system administrator to a pre-defined persistence data format. The persistence data format can be the format of the deployment descriptor associated with the component, and is defined by a service provider or the container. For example, the persistence data format can include String, Integer, Collections, Arrays, etc. In one embodiment, both of the component mapper 250 and value mapper 260 are used when a change is made to a component. The results produced by the mappers 250 and 260 are used to create the XML representation 270. It is understood that each of the persistence store 230, the persistence factory 240, the component mapper 240 and the value mapper 260 can be implemented by software, hardware, or a combination of both.

Figure 3:
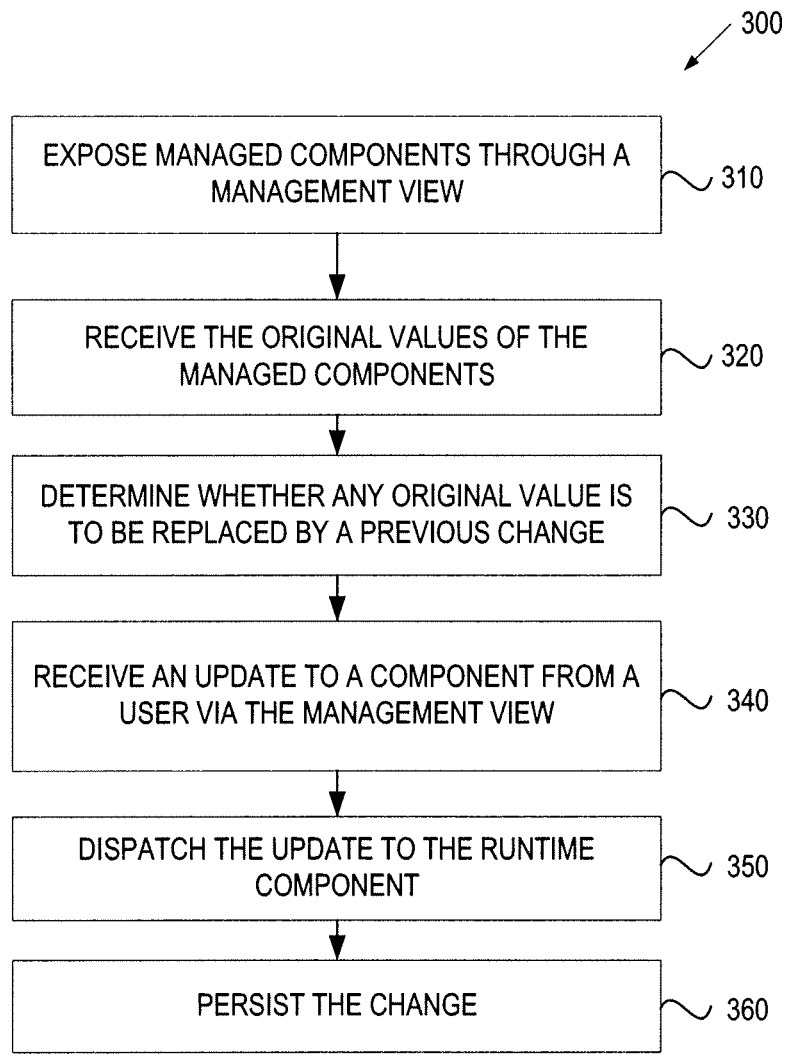
FIG. 3 is a flow diagram illustrating a method for updating a component that runs on the application server, in accordance with one embodiment of the present invention.

FIG. 3 is a flow diagram illustrating an example of a method 300 for updating a component that has been deployed for runtime operations. The method 300 may be performed by processing logic 626 of FIG. 6 that may comprise hardware (e.g., circuitry, dedicated logic, programmable logic, microcode, etc.), software (e.g., instructions run on a processing device to perform hardware simulation), or a combination thereof. In one embodiment, the method 300 is performed by the profile service 160 of FIGS. 1 and 2.

Referring to FIG. 3, in one embodiment, the method 300 begins when the profile service 160 is invoked, via the management interface 190, by a system administrator to display the management view 180 on the display of the management console 130 (block 310). The management interface 190 receives original values of the components (block 320), and determines whether any of the original values is to be replaced by a previous change (block 330). The original values of the components are pre-defined managed values in the compiled archive (e.g., a jar file, an ear file, etc.) of an application that is running on the application server 120 for providing a business service. If an update to an original value has been made previously, the update overrides the original value and is displayed as the current value of the component. If there has been no change to the original value, the original value is displayed as the current value of the component. The management view 180 thus exposes (e.g., displays) the managed components in a deployment and their current values on the display.

During the runtime, the system administrator may enter an updated value to replace a current value of a component, or may add a component or remove a component (block 340). The change can be entered via the management view 180. The management interface 190 receives the change from the management view 180, and dispatches the change to the runtime component (block 350). In a scenario where the container uses the changed value as part of the container implementation and the change also affects the runtime component, the change can be dispatched at runtime and takes effect immediately. Otherwise, the change can be applied when the application server 120 is restarted the next time. Additionally, the persistence module 150 also receives the change and passes the change to the persistence store 230, which calls the persistence factory 240 to perform a persistence update (block 360). Operations of the persistence module 150 will be described in greater detail in connection with FIG. 4.

Figure 4:
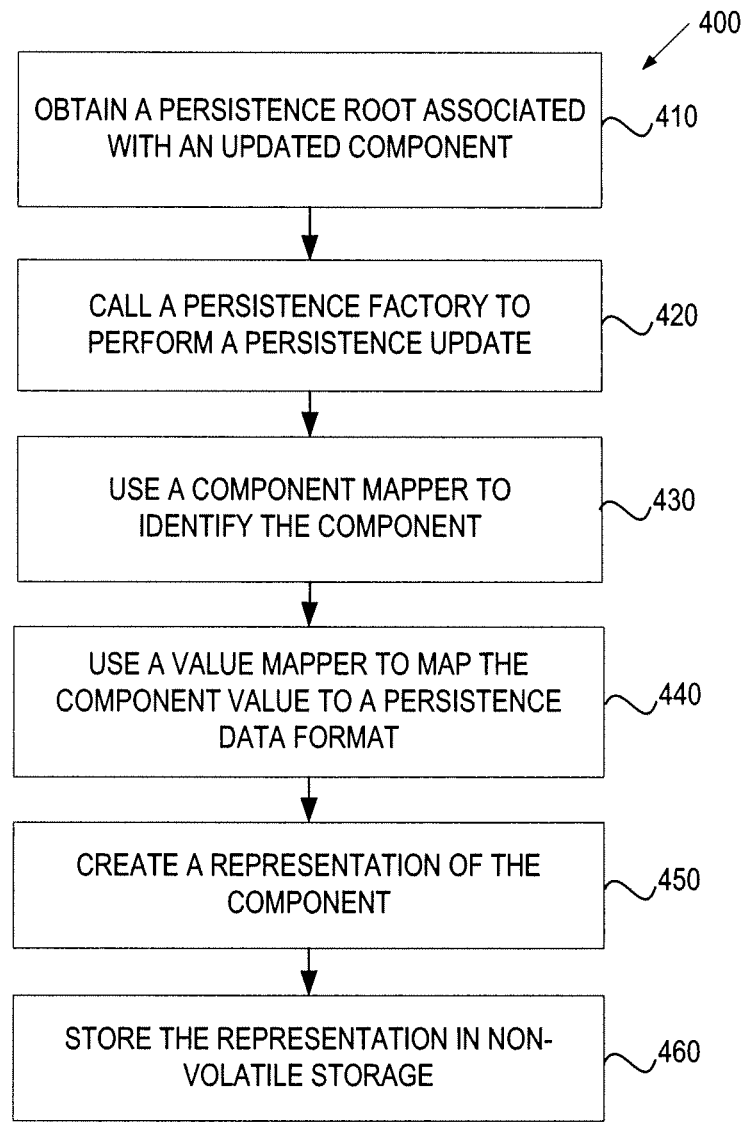
FIG. 4 is a flow diagram illustrating a method for creating a persisted representation of an updated component, in accordance with one embodiment of the present invention.

FIG. 4 is a flow diagram illustrating an example of a method 400 for creating a representation of managed values of a component for persistence storage in response to a change to the component. The method 400 may be performed by processing logic 626 of FIG. 6 that may comprise hardware (e.g., circuitry, dedicated logic, programmable logic, microcode, etc.), software (e.g., instructions run on a processing device to perform hardware simulation), or a combination thereof. In one embodiment, the method 400 is performed by the persistence module 150 of FIGS. 1 and 2.

Referring to FIG. 4, in one embodiment, the method 300 begins when the persistence store 230, upon receiving an indication of a change to a component, provides the persistence root associated with the component (block 410). The persistence root provides a reference (e.g., a pointer) to the XML representation 270 of the component. The XML representation 270 identifies whether any previous changes have been made to the component. The persistence store 230 then calls the persistence factory 240 to perform a persistence update (block 420). The persistence factory 240 calls the component mapper 250 to identify the name of the updated component (block 430). The persistence factory 240 further calls the value mapper 260 to map the changed value to a pre-defined persistence data format (block 440). The persistence factory 240 then creates a representation (e.g., an XML representation) of the updated component including the recently-changed value and previous changes (if any) (block 450). The representation also includes an association between the updated component and a deployment descriptor to which the update can be applied to persist the change. The persistence store 230 then writes the representation into storage (e.g., disks or other non-volatile data storage) (block 460).

Figure 5:
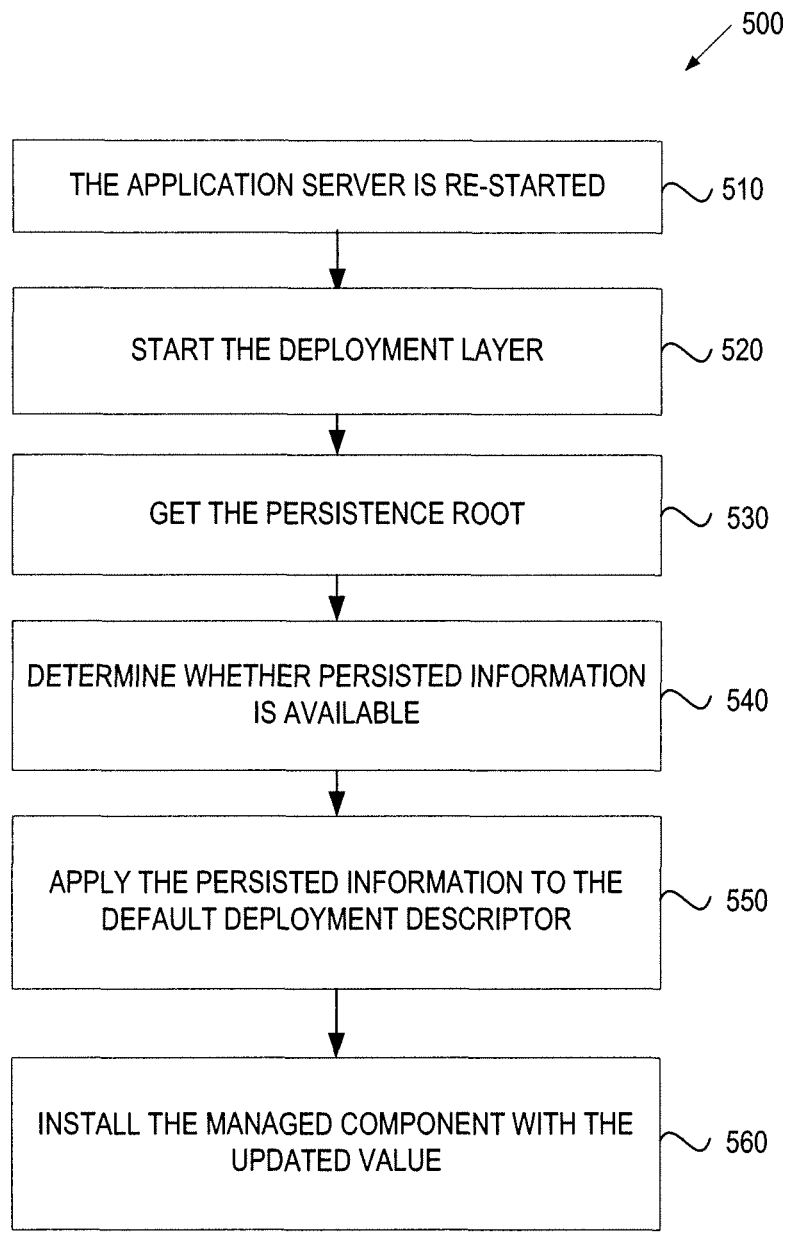
FIG. 5 is a flow diagram illustrating a method for applying a previous change to a component after the application server is re-started, in accordance with one embodiment of the present invention.

FIG. 5 is a flow diagram illustrating an example of a method 500 for applying persisted values to runtime components when an application server is re-started. The method 500 may be performed by processing logic 626 of FIG. 6 that may comprise hardware (e.g., circuitry, dedicated logic, programmable logic, microcode, etc.), software (e.g., instructions run on a processing device to perform hardware simulation), or a combination thereof. In one embodiment, the method 500 is performed by the application server 120 of FIG. 1.

Referring to FIG. 5, in one embodiment, the method 500 begins when the application server 120 is re-started (block 510). The application server 120 may be re-started after a maintenance shutdown or a failure. To resume the services offered by the application server 120, the application server 120 starts one or more deployers in the deployment layer 210 (FIG. 2) to deploy the components of the services (block 520). During the deployment process, the persistence module 150 obtains the persistence root of each component (block 530), and determines whether persisted information is available; that is, whether a change has been made to the component before the re-start (block 540). The persistence module 150 may determine whether persisted information is available by checking to see whether a stored representation associated with the component includes an update. If the persisted information is available, the persistence module 150 applies the persisted information to the original deployment descriptor associated with the component (block 550). The original deployment descriptor associated with the component is the metadata generated by the deployment layer 210 during deployment of the component. Thus, the component will be deployed with the persisted information (e.g., the updated value). The component having the updated value will be installed in the application server 120 and can be viewed by a user via the management view 180 (block 560).

Figure 6:
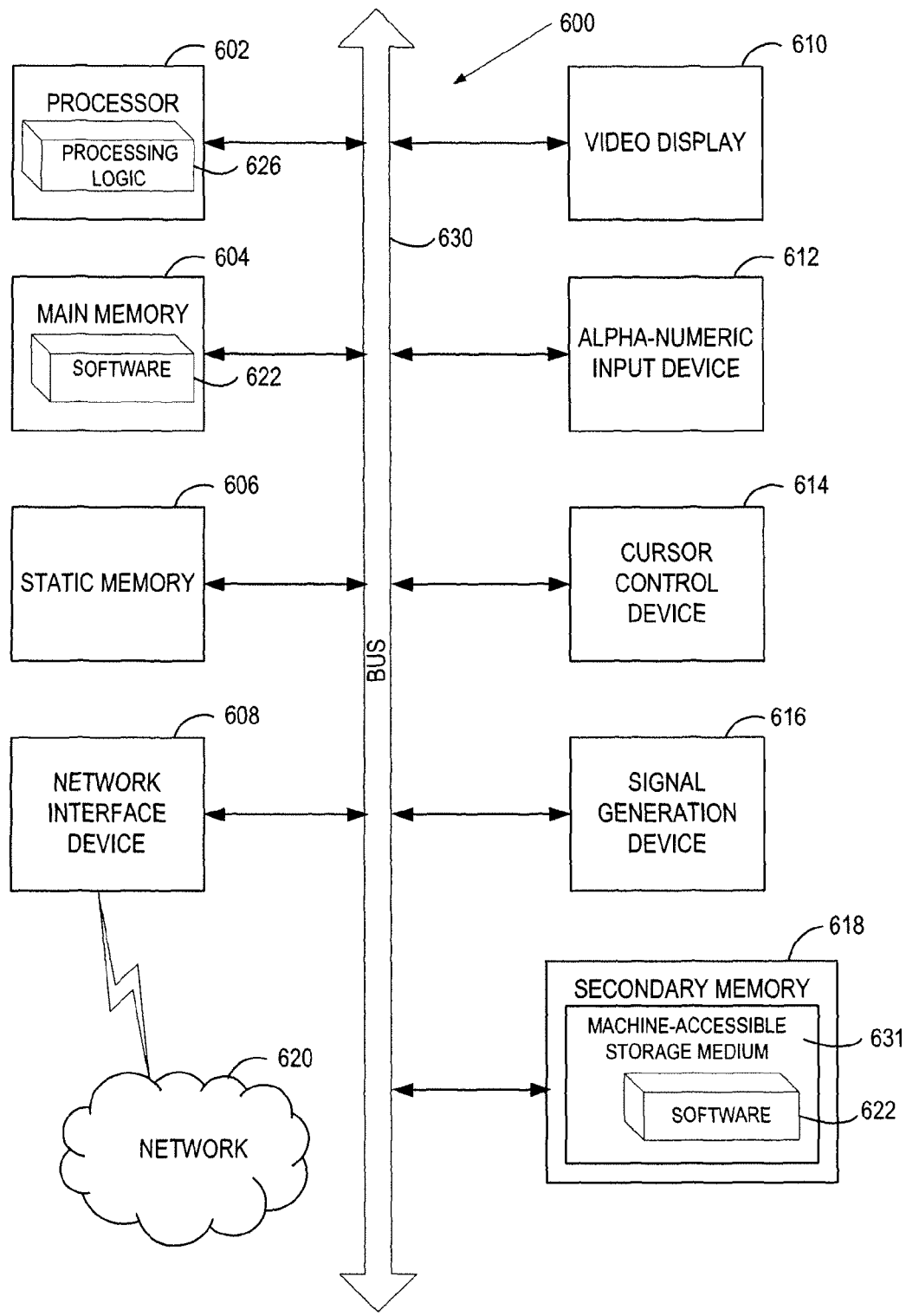
FIG. 6 illustrates a diagrammatic representation of a machine in the exemplary form of a computer system, in accordance with one embodiment of the present invention.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processor 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a secondary memory 618 (e.g., a data storage device), which communicate with each other via a bus 630.

The processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute the processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The secondary memory 618 may include a machine-readable storage medium (or more specifically a computer-readable storage medium) 631 on which is stored one or more sets of instructions (e.g., software 622) embodying any one or more of the methodologies or functions described herein. The software 622 may also reside, completely or at least partially, within the main memory 604 and/or within the processing device 602 during execution thereof by the computer system 600, the main memory 604 and the processing device 602 also constituting machine-readable storage media. The software 622 may further be transmitted or received over a network 620 via the network interface device 608.

The machine-readable storage medium 631 may store the profile service 160, the management interface 190 and/or the persistence module 150 (FIGS. 1 and 2). While the machine-readable storage medium 631 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
receiving, by a computer hosting an application server, an updated value of a component through a management console during runtime of the component;
associating, by the computer, the component with a deployment descriptor that refers to an original value of the component;
obtaining a persistence root associated with the component; and calling a persistence factory with reference to the persistence root, the deployment descriptor, and the component to create a representation;
storing, by the computer, the representation of the component in a persistence data format in non-volatile data storage, the representation comprising the updated value and indicating an association of the component with the deployment descriptor; and
applying, by the computer, the representation to the deployment descriptor when the application server is re-started to override the original value with the updated value,
wherein, when the application server is re-started, determining whether the updated value is available by referring to the persistence root that points to the representation; and upon determining that the updated value is available, updating the deployment descriptor associated with the component before the component is instantiated for runtime operation.

2. The method of claim 1 wherein the application server is a Java-based application server that comprises a persistence module to maintain persistence of the updated value when the application server is re-started.

3. The method of claim 1, wherein receiving an updated value of a component further comprises:
receiving the updated value via a management view displayed on the management console, the management view exposing managed properties of the component at runtime; and
dispatching the updated value to the component at runtime.

4. The method of claim 1, wherein associating the component to a deployment descriptor further comprises:
identifying a unique identifier that identifies the component.

5. The method of claim 1, wherein the persistence factory exposes persistence operations including one or more of the following: update a component, remove a component, add a component or restore a component.

6. A non-transitory computer readable storage medium including instructions that, when executed by a processing system, cause the processing system to perform operations comprising:
receiving, by the processing system, an updated value of a component through a management console during runtime of the component in a Java-based application server;
associating, by the processing system, the component with a deployment descriptor that refers to an original value of the component;
obtaining a persistence root associated with the component; and calling a persistence factory with reference to the persistence root, the deployment descriptor, and the component to create a representation;
storing, by the processing system, the representation of the component in a persistence data format, the representation comprising the updated value and indicating an association of the component with the deployment descriptor; and
applying, by the processing system, the representation to the deployment descriptor when the application server is re-started to override the original value with the updated value,
wherein, when the application server is re-started, determining whether the updated value is available by referring to the persistence root that points to the representation; and upon determining that the updated value is available, updating the deployment descriptor associated with the component before the component is instantiated for runtime operation.

7. The non-transitory computer readable storage medium of claim 6, wherein receiving an updated value of a component further comprises: receiving the updated value via a management view displayed on the management console, the management view exposing managed properties of the component at runtime; and dispatching the updated value to the component at runtime.

8. The non-transitory computer readable storage medium of claim 6, wherein associating the component to a deployment descriptor further comprises: identifying a unique identifier that identifies the component.

9. The non-transitory computer readable storage medium of claim 6, wherein the persistence factory exposes persistence operations including one or more of the following: update a component, remove a component, add a component or restore a component.

10. The non-transitory computer readable storage medium of claim 6, wherein the deployment descriptor is generated as metadata by the application server during deployment of the component to the application server.

11. A system comprising:
a monitoring console to receive an updated value of a component during runtime of the component; and
a computer system, coupled to the monitoring console, to run a Java-based application server, the computer comprising:
a profile service to associate the component with a deployment descriptor that refers to an original value of the component, the profile service comprising:
a persistence factory to create the representation with reference to a persistence root that points to the representation, the deployment descriptor, and the component;
data storage coupled to the profile service to store the representation of the component in a persistence data format, the representation to comprise the updated value and to indicate an association of the component with the deployment descriptor;

wherein, when the application server is re-started, the profile service applies the representation to the deployment descriptor to override the original value with the updated value, wherein, the profile service further comprises a persistence module to determine, after the restart of the application server, whether the updated value is available by referring to the persistence root that points to the representation; and upon determination that the updated value is available, the persistence module to update the deployment descriptor associated with the component before the component is instantiated for runtime operation.

12. The system of claim 11, wherein the management console displays managed properties of the component at runtime, and interfaces with a management interface to dispatch the updated value to the component at runtime.

13. The system of claim 11, wherein the profile service further comprises a component mapper to identify a unique identifier that identifies the component.

14. The system of claim 11, wherein the persistence factory exposes persistence operations that include one or more of the following: update a component, remove a component, add a component or restore a component.

* * * * *